United States Patent [19]

Herbert et al.

[11] Patent Number: 4,916,576
[45] Date of Patent: Apr. 10, 1990

[54] MATRIX CAPACITOR

[75] Inventors: Edward Herbert, Canton; John D. Repp, Barkhamsted, both of Conn.

[73] Assignee: FMTT, Inc., Canton, Conn.

[21] Appl. No.: 316,091

[22] Filed: Feb. 27, 1989

[51] Int. Cl.⁴ .................. H05K 7/00; H01R 13/66
[52] U.S. Cl. ................................. 361/393; 333/181
[58] Field of Search ............... 361/306, 393, 321, 509, 361/538, 529, 535; 174/52 FP; 333/181

[56] References Cited

U.S. PATENT DOCUMENTS

| | | | |
|---|---|---|---|
| 3,440,495 | 4/1969 | Howard et al. | 361/529 |
| 4,144,509 | 3/1979 | Boutros | 333/181 |
| 4,209,754 | 6/1980 | Shiki et al. | 361/321 X |
| 4,580,866 | 4/1986 | Hagner | 333/181 X |
| 4,626,958 | 12/1986 | Lockard et al. | 361/306 |
| 4,792,310 | 12/1988 | Hori et al. | 333/181 X |

OTHER PUBLICATIONS

High Density Mounting Power Supply, by Bui, Petit, and Val, pp. 264–271, Mar. 1989.

Primary Examiner—Donald A. Griffin
Attorney, Agent, or Firm—McCormick, Paulding & Huber

[57] ABSTRACT

A multipin matrix capacitor includes a first and second electrode separated by a dielectric material to form a capacitive element and includes terminals for connecting it to the first and second electrode wherein the terminals are distributed along the electrodes in a grid arrangement. Inductances are minimized or substantially eliminated in lead connections to the matrix capacitor due to the reduced conduction path lengths possible between an external component and the capacitor since access to the capacitor is provided at substantially all areas of the electrodes forming the capacitor. In one aspect of the invention, DC current is conducted along the surface of conductive sheets comprising the electrodes.

19 Claims, 10 Drawing Sheets $L_1 \neq L_2 \neq L_3$ $L_1 = L_2 = L_3$

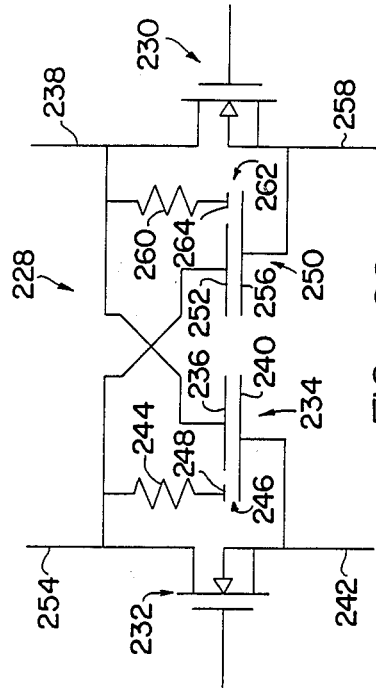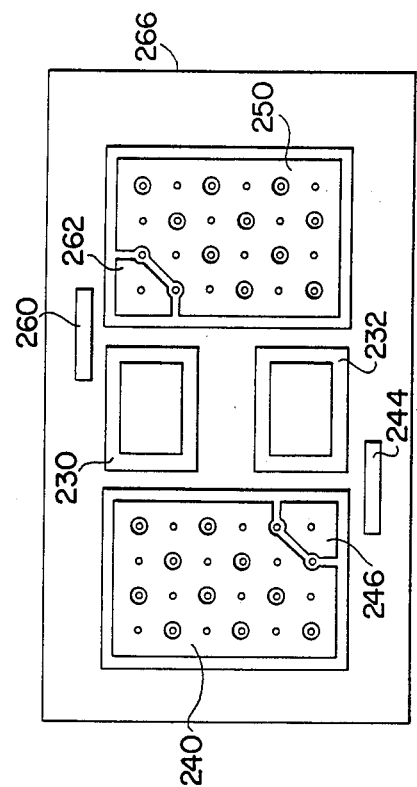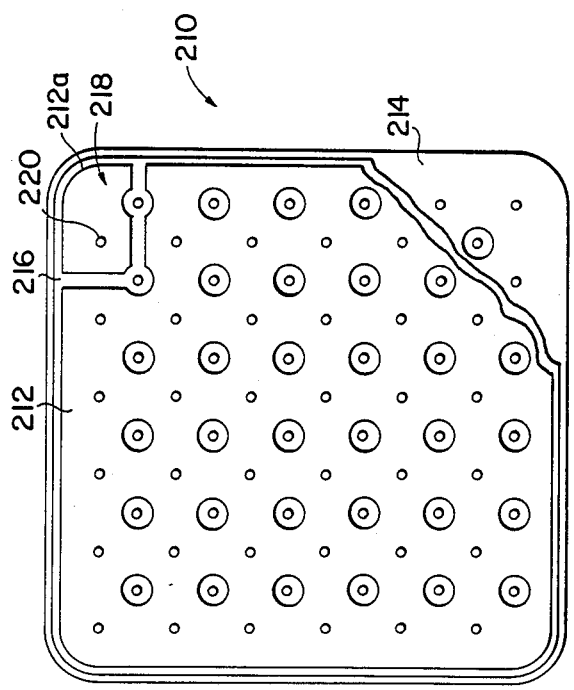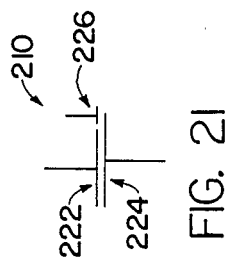

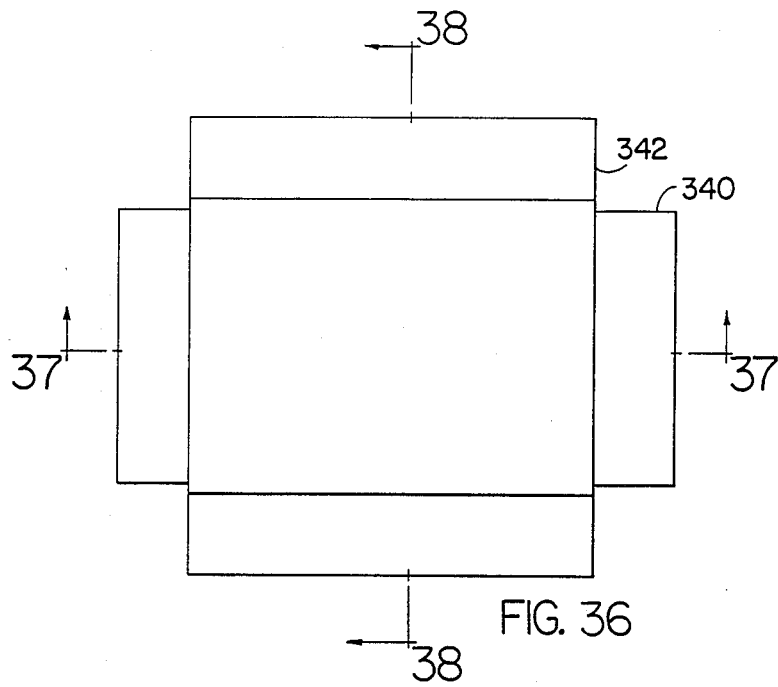
FIG. 36
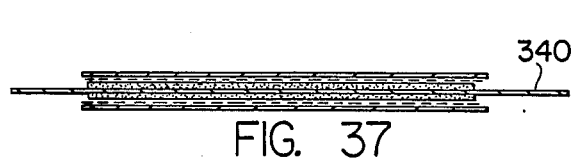
FIG. 37
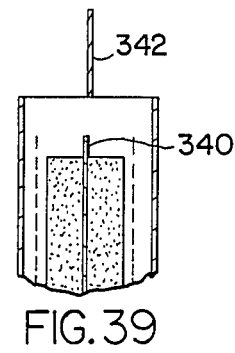
FIG. 39
FIG. 38
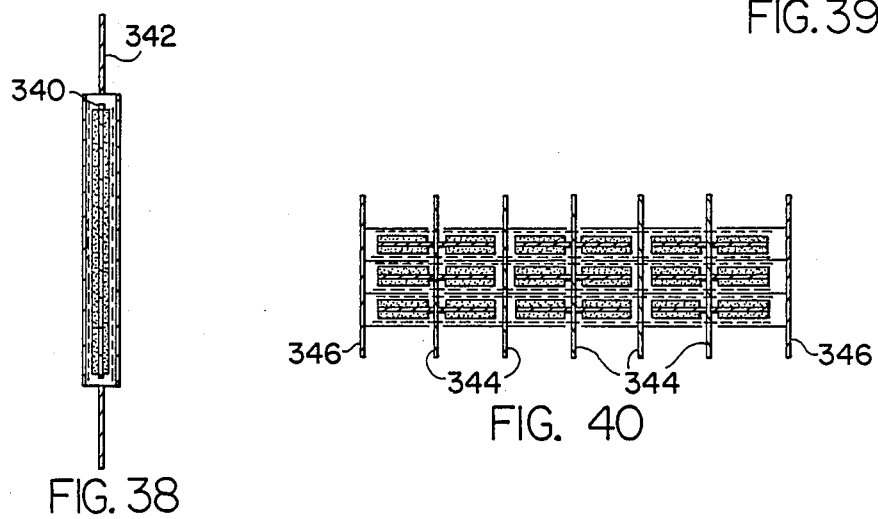
FIG. 40

MATRIX CAPACITOR

BACKGROUND OF THE INVENTION

The present invention relates generally to capacitive devices and deals more specifically with a high frequency capacitor and a capacitor geometry and construction for minimizing series inductance.

It is well known to those skilled in the art to use capacitive devices for decoupling and filtering. Typically, decoupling capacitors store energy which is returned to the circuit elements upon demand to maintain the magnitude of the voltage energizing the circuit elements at a substantially constant, fixed level. The function of the decoupling capacitor is to provide the energy transfer without generating noise and in the case of logic circuitry without introducing logic errors or spikes. In contrast, filter capacitors are generally used to shunt noise or other unwanted high frequency signals to ground. In this respecti, the capacitor acts as a low pass filter offering an impedance path that is frequency dependent. An analysis of the capacitor at high frequencies reveals that the capacitor is equivalent to a series inductive-resistive-capacitive equivalent circuit. Consequently, a capacitor is not purely capacitive but inductive as well and its performance as a capacitive device at higher frequencies is limited due to its increased impedance.

Conventional capacitor construction and geometries are well known to those skilled in the art. One conventional feed through capacitor has a wire which passes through the center of the capacitor and is terminated to one end of the capacitor element. The case of the capacitor, generally referred to as the ground terminal is connected to the other end of the capacitor element. In such a capacitor, only AC current passes through the electrode.

Another well known capacitor geometry is used in the multi-layer ceramic "MLC" capacitor. The MLC geometry is generally used for multiple pin connectors wherein one electrode is grounded and a number of isolated electrodes are connected to metalized holes. The connector pins pass through the holes in the back shell and are connected to the capacitors making a number of feed through capacitors one for each connector pin. Each of the capacitors has one electrode which is separate from one another but all share a common ground electrode.

An additional geometry uses a capacitor with two leads connected to the internal capacitor element and is typically used for high frequency, low effective series resistance (ESR) capacitors in high frequency power supplies.

It is a general aim of the present invention to provide a capacitor geometry and structure that minimized the effects of inductance by providing a number of connections across the area of the capacitor.

SUMMARY OF INVENTION

In accordance with the present invention, a multipin matrix capacitor for use at high frequencies is presented and inclused a plurality of first sheets of conductive material defining a first electrode and a second plurality of sheets of conductive material defining a second electrode wherein the first and second sheets of conductive material are stacked in an interleaved arrangement and are separated by a dielectric material to form the capacitive element.

In one aspect of the invention, a plurality of first means in the form of pins or stakes are provided and contact each of the first sheets of conductive material and provide connecting means to the first electrode. A plurality of second means in the form of pins or stakes contact each of the second sheets of conductive material and provide connecting means to the second electrode. The first and second connecting means are disposed adjacent to one another in a grid arrangement so that contact with the first and second electrodes is distributed along the surface of the first and second sheets of conductive material to minimize the conduction path between the first and the second connecting means and the first and second electrodes respectively whereby inductance due to the conduction path is substantially eliminated. The capacitor is arranged to conduct DC current along the surfaces of the conductor sheets comprising the electrodes.

In another aspect of the invention, a section of one of the first and second sheets of the conductive material forms a third electrode to provide a split capacitor.

In yet another aspect of the invention, one of the electrodes is made of a sintered tantalum material and is enclosed within a hermetically sealed case which is filled with an electrolyte to form an electrolytic matrix capacitor. A number of terminals are arranged in a pin grid array to permit contact to the sintered tantalum along the surface of the electrode.

BRIEF DESCRIPTION OF THE DRAWINGS

Additional features and advantages of the present invention will become readily apparent from the following written description and drawings wherein:

FIG. 20 is another embodiment of the present invention wherein the multipin capacitor of FIG. 11 includes a section to form a split capacitor.

FIG. 21 is a schematic illustration of the split capacitor of FIG. 20.

FIG. 22 is a schematic of a symmetrical push pull circuit using a split capacitor illustrated in FIG. 21.

FIG. 23 is a plan view of a hybrid circuit substrate upon which the circuit components and the split capacitor of FIG. 20 are mounted.

FIG. 36-39 illustrates the electrolytic functional equivalent of the capacitor of FIG. 1.

FIG. 40 illustrates the electrolytic functional equivalent of the capacitor of FIG. 9.

DETAILED DESCRIPTION OF THE PREFERRED EMBODIMENTS

Figure 1:
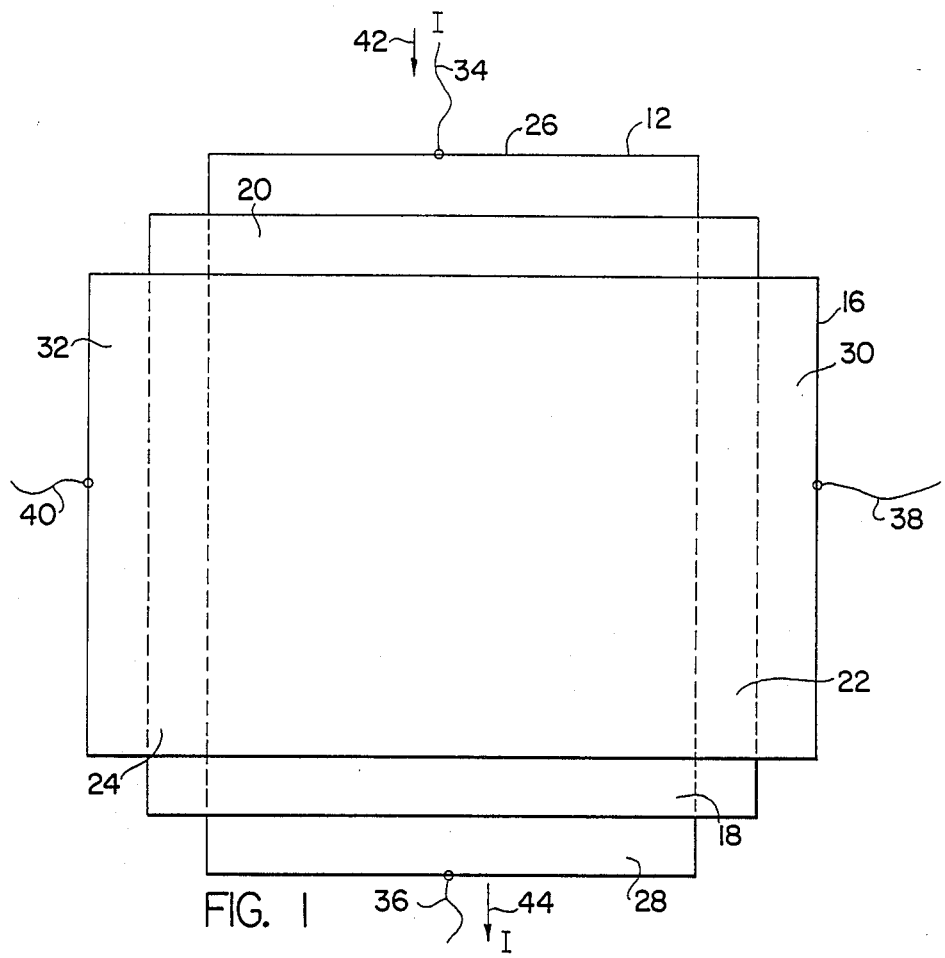
FIG. 1 shows the basic structural concept of the interleaved foil sheets forming the capacitive element used in the present invention.
Figure 2:
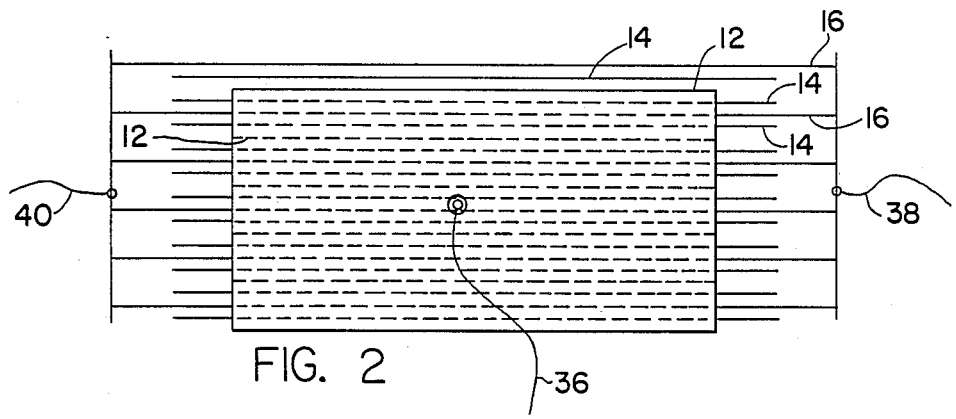
FIG. 2 is an end view illustrating a stack of interleaved sheets of the capactitive element of FIG. 1.

Turning now the drawings and considering the invention in further detail, FIGS. 1 and 2 illustrate the basic geometric structure of a capacitor embodying the present invention. FIG. 1 illustrates the basic construction concept of a capacitor wherein a number of foils are interleaved by sheets of dielectric material. In FIG. 1, it is seen that the basic capacitor structure 10 includes a first foil sheet 12, a sheet of dielectric material or insulator 14 and a second foil sheet 16 arranged so that the dielectric sheet material 14 separates the foils 12 and 16. The foil sheet 12 and 16 are substantially identical to one another and are arranged in a alternating pattern with each sheet being in a transverse direction to another sheet such that the longitudinal dimension of one sheet is transverse to the longitudinal dimension of an adjacent sheet. The sheet of dielectric material 14 is dimensioned to be larger than the horizontal dimension of the foil sheets 12 and 16 and to be smaller than the longitudinal dimension of the foil sheet 12 and 16. Marginal areas 18, 20 of dielectric material are provided in the longitudinal direction of sheet 12 and marginal area 22, 24 dielectric material are provided in the horizontal direction of sheet 12. As can be seen, th foil sheets 12 and 16 may be interleaved and separated by the dielectric sheet 14 so that the longitudinal ends 26, 28 of sheet 12 extend beyond the dielectric sheet 14 and yet are insulated from the foil sheet 16. In a similar manner, the foil sheet 16 has longitudinal ends 30, 32 which extend beyond the dielectric sheet 14 while remaining insulated from the foil sheet 12.

Each of the foil sheets 12, 14 may be electrically terminated to provide connection to the longitudinal ends of the foil sheets. As illustrated, terminations 34, 36 are made to the respective longitudinal ends of sheet 12 and terminations 38, 40 are made to the respective longitudinal ends of sheet 16.

FIG. 2 illustrates the alternating pattern arrangement of FIG. 1 stacked in a parallel fashion wherein each set of foil sheets 16, 16 are shown with their respective longitudinal ends connected to one another and terminated in connections 38 and 40, respectively. SImilarly, longitudinal ends of the set of foil sheets 12, 12 are connected to one another and terminated in connection 36. It is recognized from FIG. 2. that the stacked alternating pattern arrangement of foil sheets and dielectric sheets is similar to that of the well-known flat plate capacitor. Accordingly, the characteristics of a flat plate capacitor and its associated characterizing equations and relationships are also applicable to the structure of FIG. 2 and the foil sheets may be thought of as the "plates" of the capacitor.

However, in contrast to the conventional flat plate capacitor, the capacitor of the present invention may carry DC current along the surfaces of the foil sheets forming the capacitor with current entering one longitudinal end and exiting the opposite longitudinal end of a foil sheet. For example, as shown in FIG. 1, current I can enter the connection 34 in the direction of arrow 42 and exit the opposite longitudinal end through the connection 36 in the direction of arrow 44. The connections 38 and 40, respectively of the foil sheet 16 may be connected to ground. The current I that may be carried by a respective foil sheet is limited since the thickness of the foil sheet is generally very thin. However, since a large number may be connected in parallel, the total current carried may be appreciable. In additon, the thickness of the foil sheet could be increased to improve its lateral conductivity again permitting larger magnitudes of DC current to be carried. The foil sheets could also be made of extended foil to prevent puncture by excessive AC currents. In any event, film capacitors are generally always wound and carry no DC current through or along the film comprising the capacitor is possible in the present invention.

Another advantage of the geometric structure of the capacitor of the present invention is that any stray inductance will appear in series with the through current I and substantially no stray inductance will generally appear in series with the capacitive element. Thus, the capacitor will exhibit better high frequency performance than conventional capacitors.

Figure 3:
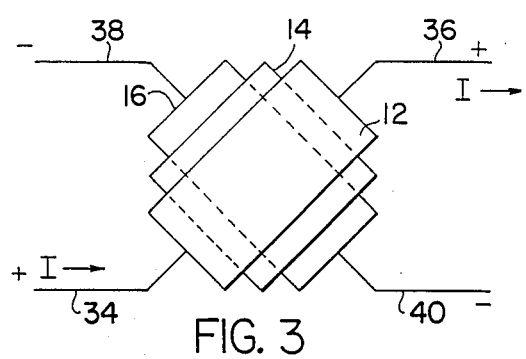
FIG. 3 illustrates current I paths in the capacitive element utilized in the capacitor of the present invention.
Figure 4:
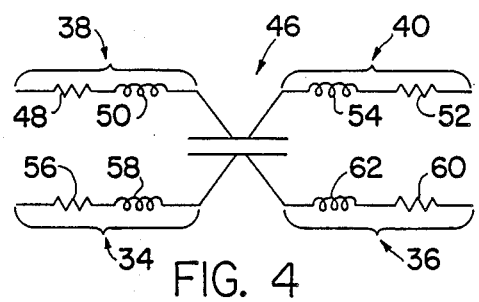
FIG. 4 illustrates schematically the equivalent circuit of the capacitor of FIG. 3 including parasitic inductances and resistances.
Figure 5:
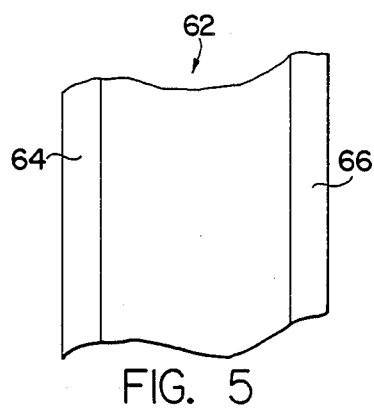
FIG. 5 shows a metalized foil with marginal insulating edges.

Turning now to FIGS. 3 and 4, FIG. 3 illustrates that both sets of foil sheets 12, 12 and 16, 16 may be arranged to carry current I to further improve the throughput of the capacitor. As illustrated in FIG. 3, current I can enter lead 34, flow across the surface of the foil sheet 12 and exit lead 36. Likewise, current I can enter lead 38 and exit lead 40. If the capacitor is used as a decoupling capacitor, leads 38 and 40 can be connected to electrical ground. FIG. 4 is an illustration of the equivalent circuit of the capacitor of FIG. 3. The capacitive element is generally indicated 46 and illustrates the resultant parasitic inductance and resistance due to the terminations of the leads to the foil sheets. For illustrative purposes, resistance 48 and inductance 50 are shown associated with the lead connection 38, resistance 52 and inductance 54 with the lead connection 40, the resistance 56 and inductance 58 with the lead connection 34 and resistance 60 and inductance 62 with the lead connection 36. Because the resistance and inductance are associated with the parcitics and the terminations, the capacitive element 46 approaches the characteristics of an ideal capacitor.

the capacitor of the present invention may also be constructed using a metalized film to accommodate applications wherein low DC currents are involved an in which a higher capacitance per unit of volume is necessary. Such a metalized film is illustrated in FIG. 5 and is generally designated 62. The film 62 is shown with insulating marginal areas 64, 66 along each longitudinal side. If the metalized film sheet is made as a square and the sheets are alternately arranged so that the insulating margin of one sheet is transverse to the insulating margin of an adjacent sheet and the sheets are stacked in this alternating arrangement, the construction of the capacitor is the equivalent of the structure illustrated in FIGS. 1 and 2. The four sides of the resulting structure may be metalized to allow termination of the metalized edges. The entire capacitor structure may now be sealed. The resultant capacitor geometry is illustrated in FIG. 6 and is applicable to the construction of other capacitors including ceramic and electrolytic types.

Figure 6:
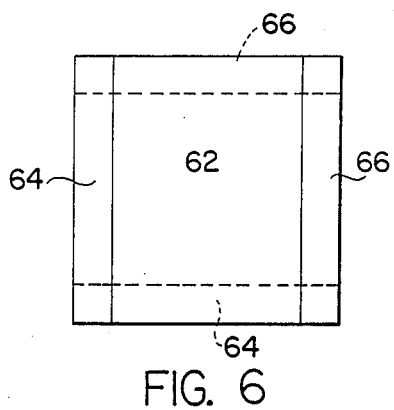
FIG. 6 illustrates the geometry of the metalized foils of FIG. 5 and in forming a capacitor of the present invention.
Figure 7:
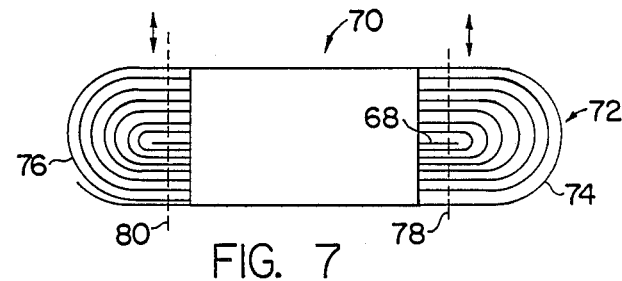
FIG. 7 illustrates a capacitor made in accordance with geometry of FIG. 6.

One method for constructing the capacitor geometry of FIG. 6 is illustrated in FIG. 7 wherein a card form 68 is wound with two coil 70 and 72 in an interleaved fashion and transverse to one another. Each wrap of one coil is followed by a wrap in a transverse direction to the immediately preceding wrap of the second coil to provide the interleaved arrangement. After the coils are wrapped, the ends of the respective coils are sheared to expose the edges of the foil sheets to permit access for terminations. In the illustration of FIG. 7, coil 72 is sheared at its respective ends 74 and 76 along the dashed lines 78 and 80 respectively. Similarly, the coil 70 is also sheared at its respective ends. The sheared edges have the same characteristics as metalized film capacitors and may be solder sprayed so that leads may be attached.

The coils 70, 72 could also be made from a metalized film with insulating margins or could also be made of a combination of a foil and film wound together. If the construction is made with a foil and film together and the film is wound with a greater tension than the foil or alternatively, if the film were moderately shrinkable, the film would pull back from the edges after cutting to permit a better termination to be made to the foil windings.

Figure 8:
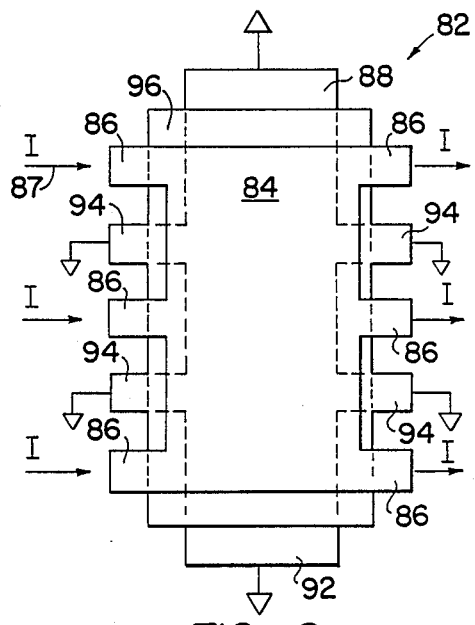
FIG. 8 is another embodiment of the present invention wherein the alternate layers of the capacitors are tabbed to provide a number of connection points along the periphery of the capacitor.

Another embodiment of the capacitor of the present invention is illustrated in FIG. 8 and is generally designated 82. The capacitor 82 of FIG. 8 is similar in construction to the capacitor of FIGS. 1 and 2 in that foil sheets are alternately stacked with a dielectric sheet separating adjacent foil sheets. In FIG. 8, the capacitor 82 includes a first foil sheet 84 having a number of tabbed portions 86, 86 extending in a direction transverse to the longitudinal direction of the foil sheet 84 and which tabs are arranged in a spaced relationship with one another. A second tabbed foil sheet 88 also includes tabs 94, 94 which extend outwardly in a transverse direction from the longitudinal sides of the sheet 88 in a manner similar to the tabs 86, 86 of the tabbed sheet 84. The tabs 94, 94 are in a spaced relationship with one another and alternate or interdigitate with tabs 86, 86 of the tab foil sheet 84. In a similar manner as described in connection with FIGS. 1 and 2, a dielectric sheet 96 is used to separate the alternating tabbed film sheets 84 and 88, respectively as the sheets are stacked. The metal film may be exposed as described above to permit termination to the tabs of the respective alternating tab sheets 84 and 88. One advantage of the tabbed capacitor of FIG. 8 is that a number of terminals are distributed along the area of the capacitor so that any area of the capacitor is close to a termination point which minimizes that lead lengths between a circuit component and the capacitor to reduce lead inductance. As in the case of the capacitor illustrated in FIG. 3, both sets of foil sheets 84, 88 may be made to carry current to increase the throughput of the capacitor.

The capacitor 82 of FIG. 8 is illustrated as it might be arranged in a decoupling application. One set of foil sheets 88, 88 have their respective tabs 94, 94 connected to a ground reference potential. The other set of foil sheets 84, 84 have their respective tabs 86, 86 arranged to carry current I in the direction of arrow 87 across the surface of the foil sheets 84, 84 and out the tabs 86, 86 opposite the input tabs.

Figure 9:
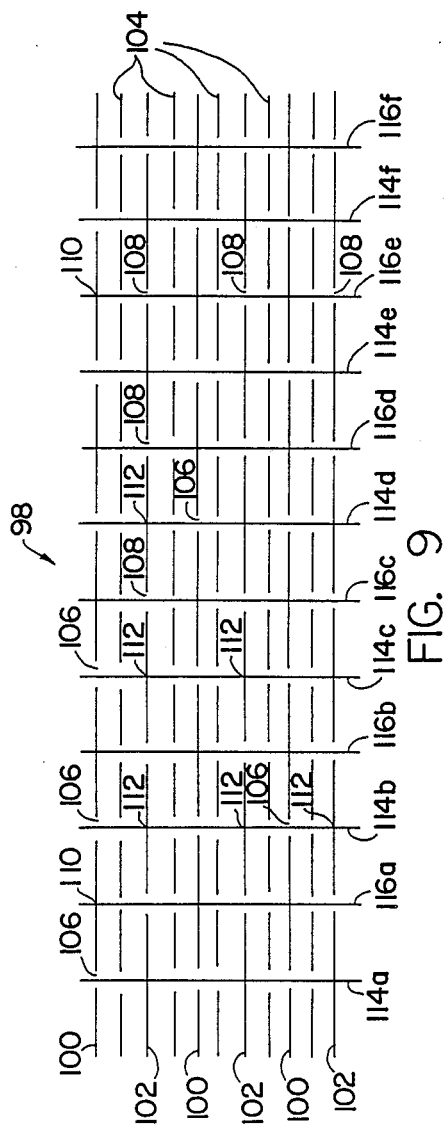
FIG. 9 illustrates schematically a multipin, flat plate capacitor embodying the present invention.

Considering now another embodiment of the present invention, FIG. 9 illustrates diagrammatically a flat plate multipin capacitor as described above wherein a number of terminals or stakes are distributed along the surface area of foil sheets of the capacitor. In FIG. 9, a capacitor generally designated 98 is illustrated and comprises a number of first plates 100, 100 interleaved with a second set of plates 102, 102. Dielectric sheets 104, 104 separate the surfaces of the interleaved plates 100 and 102, respectively as illustrated. Each of the plates 100, 100 have a number of openings 106, 106 which extend through the plate and are in registry with like holes in other like plates 100, 100 in the interleaved stack. Similarly, plates 102, 102 having openings 108, 108 extending through the plate and in registration with like holes 108, 108 in other like plates 102, 102 in the stack of interleaved plates 100, 102. In addition, plates 100, 100 have second, smaller openings 110, 110 which are located in registration with holes 108, 108 in other 102, 102 in the interleaved set of stacked plates. Likewise, plates 102, 102 have small holes 112, 112 arranged so that the holes 112 of one plate 102 are in registration with the holes 106 of others plate 100, 100 in the stack of interleaved plates 100, 102. As illustrated in FIG. 9, the holes 106 and 112 are in registration with one another as are the holes 108 and 110 in registration with one another. Pins or stakes 114a, 114b, 114c and 114d are used to connect plates 102, 102 to one another as illustrated in FIG. 9. Likewise, pins or stakes 116a, 116b, 116c and 116d are forced through the holes 110, 110 in the plates 100, 100 to connect the plates to 100 to one another. The openings of holes 106 and 108 in the plates 100 and 102 respectively are large enough to provide sufficient clearance for the respective pins 114, 116 which pass through and connect the plates together. Preferably, the dielectric sheet 104 also' has holes which are in registration with the holes 106, 108, 110 and 112 to provide clearance for the respective pins 114, 116 which pass through.

The diameter of the holes 110, 110 and 112, 112 is made slightly smaller than the cross sectional area of the pins 114, 116 so that when the pins are forced through holes interference fit occurs between the pins and the plates so that there is a contact between the respective plate and the associated pin which passes through. Other methods for achieving the above result may also be used; for example, the plates made be may with clearance holes in the respective alternating plates in registration wherein the plates are stacked and compressed to form the structure of the capacitor. The contact holes can then be drilled and then the pins inserted to provide contact with the associated interleaved plates. Obviously the contact holes are smaller than the clearance holes through which the pins pass to allow displacement contact. Such displacement contact methods are well known, for example, inserting a square pin into a round hole. A capacitor constructed in accordance with the above method may be sealed, encased, or reinforced.

Figure 10A:
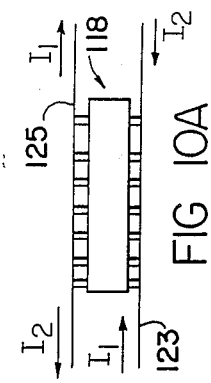
FIG. 10a is a diagrammatic representation of the matrix capacitor having bus sections arranged to provide equal conduction path lengths.
Figure 10B:
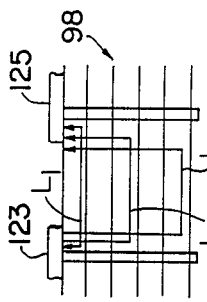
FIG. 10b is an illustration showing the unequal conduction paths of the capacitor arrangement of FIG. 10.
Figure 10C:
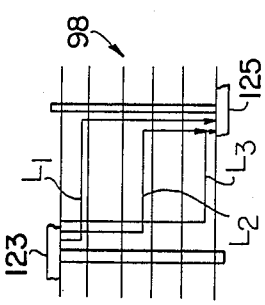
FIG. 10c is an illustration showing equal conduction paths for an alternate arrangement of the capacitor of FIG. 10.
Figure 10:
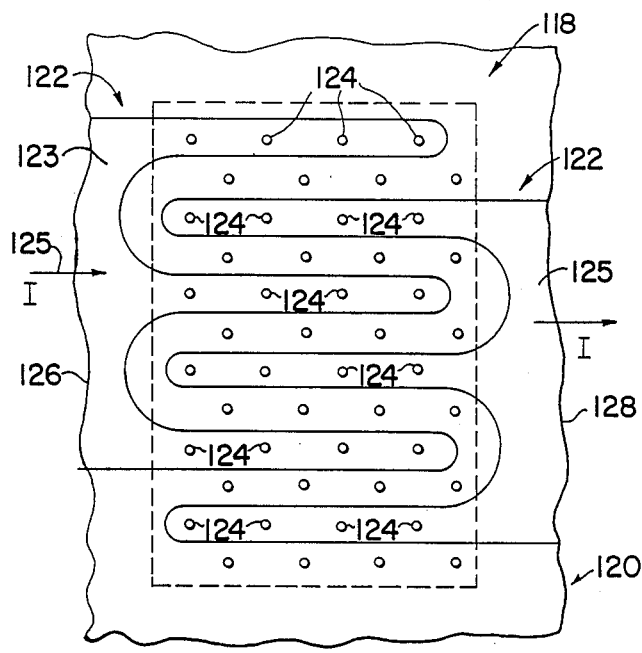
FIG. 10 is a partial view of a printed circuit board upon which the multipin capacitor of the present invention is mounted and connected to an interdigitated bus.

The structure of the multipin flat plate capacitor of FIG. 9 is well suited for use on a printed circuit board having a ground and at least one power plane wherein the pins connected to one set of plates are connected to the power plane and the pins connected to the other set of plates are connected to the ground plane. FIG. 10 is a fragmentary, schematic view of a multipin capacitor and a PC board wherein the capacitor, generally designated 118 is mounted on a printed circuit board generally designated 120. A bus generally designated 122 which may be the power or ground plane is illustrated and includes bus sections 123 and 125 each of which are connect to the pins 124, 124 which are attached to one set of the interleaved plates of the capacitor 118. The bus 122 is interdigitated so that current I entering one end 126 in the direction of arrow 125 of the bus 123 flows through the plates of the capacitor connected by the pins 124, 124 to reach the bus 125 and out the 128.

One drawback to the arrangement of FIG. 10 is that the conduction path lengths through the capacitor are unequal. In order to better equalize the lengths of the conductive paths in the capacitor 118, and the better distribute the current flowing through the capacitor, it is preferable that the contacts be made with the bus sections on opposite sides of the capacitor as illustrated diagrammatically in FIG. 10a. In FIG. 10a, bus section 123 is shown at one side of the capacitor 118 and bus section 125 is also shown at the opposite side. As in the case of FIG. 10, current I, enters one end of the bus section 123, passes through the capacitor 118 and to the bus section 125. It will be recognized that bus sections 123 and 125 are connected to one set of plates and form one connection to the capacitor 118. A second connection may be formed by similar interdigitated bus sections which are connected to the second set of plates of the capacitor 118. The similar bus sections are shown in phantom in FIG. 10a and carry current $I_2$. Referring to FIGS. 10b and 10c, it will be seen that the conduction paths lengths through the capacitor are unequal in FIG. 10b and become appreciable when the capacitor is built up with a number of interleaved plates. In FIG. 10b wherein the bus section 123 and 125 are shown located on the same surface, the conduction path $L_1$ 1 for current is shorter than the conduction path $L_2$ for current $I_2$. In comparison FIG. 10c illustrates on bus section 123 located on one surface of the capacitor and the bus section 125 on the surface on the opposite side of the capacitor 98. In the arrangement of FIG. 10c it is seen that all conduction paths $L_1$, $L_2$, through the capacitor are equal. Current $I_1$ travels the same distance as current $I_2$.

Figure 11:
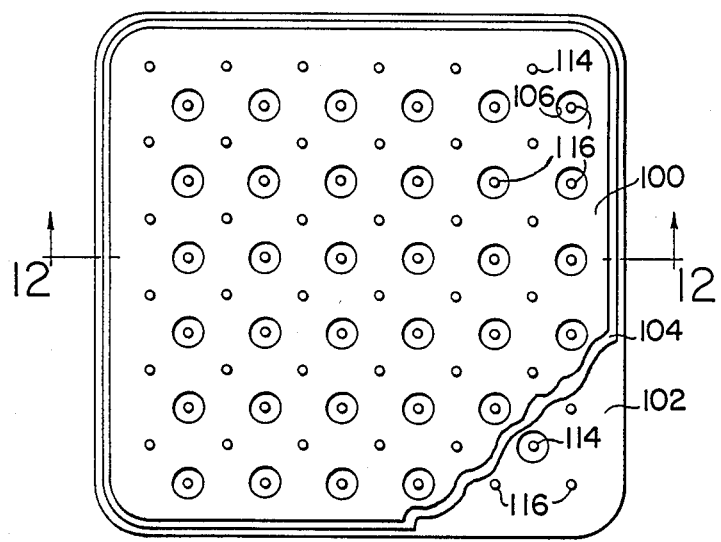
FIG. 11 is a plan view of the capacitor of the FIG. 9.
Figure 12:
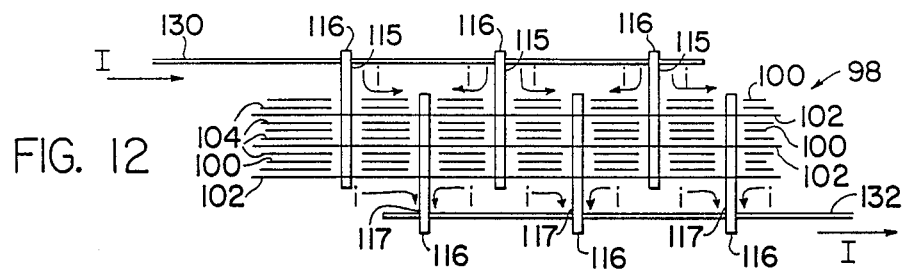
FIG. 12 is a sectional view taken along the line 12—12 of the FIG. 11.

Considering now FIGS. 11 and 12, a plan view of the capacitor illustrated in FIG. 9 is shown in FIG. 11 where like reference numerals refer to like parts and FIG. 12 is a sectional view of teh capacitor 98 taken along the lines 12, 12 of FIG. 11. In FIG. 12, a terminal or bus 130 is shown connected to one end 115 of pins 116, 116 which extend beyond the uppermost plate 100 of the capacitor 98. A second terminal or bus 132 is shown connected to one end 117 of pins 116, 116 which extend beyond the lowermost plate 102 of the capacitor 98. Current I enters the bus 130 and is conducted through the pins 116, 116 and the plates and exits the bus 132. The pins 116, 116 in addition to providing an electrical connection also act as heat conduits to transfer heat developed in the capacitor to the buses 130, 132. It will be recognized that a second set of pins and buses connect to the other set of plates 100, 100.

Figure 12A:
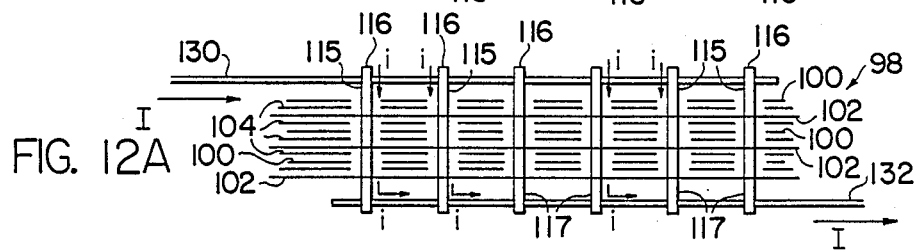
FIG. 12a is an alternate embodiment of the capacitor of FIG. 12 and illustrates one possible interconnection arrangement.
Figure 12B:
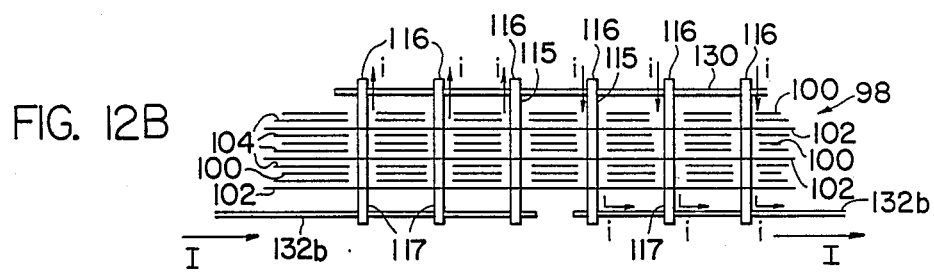
FIG. 12b is an alternate embodiment of the capacitor of FIG. 12 and illustrates another possible interconnection arrangement.

FIGS. 12 a and b show alternate embodiments of the capacitor of FIG. 12. The arrangement illustrated in FIG. 12a is suitable for large DC currents. Each of the pins 116, 116 extend beyond both the uppermost and lowermost plates of the capacitor so that large magnitude DC currents are conducted by the pins rather than completely along the surface of the plates as done in the capacitor of FIG. 12. The arrangement of FIG. 12a is not suited for use with single layer printed circuit boards. The arrangement of FIGS. 12b is suitable for larger DC currents and may be used with a single layer printed circuit board. In FIG. 12b, current I enters bus section 132a, is conducted through the pins 116, 116 the bus 130 and the surface of the plates 102, 102 back to the bus section 132b. The bus sections 132a and 132b are connected to the printed circuit board. Again, as in the case of the capacitor arrangement of FIG. 12, the capacitor arrangements of FIGS. 12a and 12b include a second set of pins and buses connected to the other set of plates 100, 100.

Figure 13:
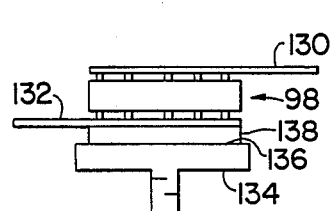
FIG. 13 is a view of the capacitor of FIG. 12 mounted on a heat sink.

FIG. 13 illustrates diagrammatically the capacitor arrangement and which arrangement overcomes the heating problem generally associated with ceramic capacitors of FIG. 12, the bus 132 is shown bonded to a surface 136 of a heat sink terminal 134. The capacitor may or may not require electrical insulation from the heat sink stud 134 depending upon the circuit configuration with which it is used such as being connected to chassis ground. If electrical insulation is required, an insulating layer 138 having a suitable dielectric characteristic and which provides a good thermal conductivity is utilized. In addition, the heat sinking stud 134 is preferably made of a material having a high thermal conductivity such as copper. In addition, the pins of the capacitor may also be made of copper to provide additional heat sinking capacity.

Figure 15:
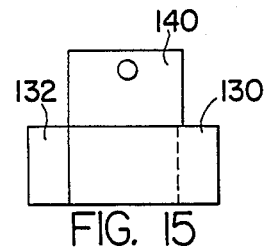
FIG. 15 is a plan view of the snubber circuit of FIG. 14.
Figure 14:
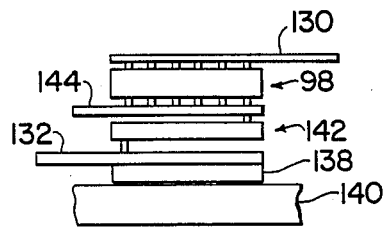
FIG. 14 is a diagrammatic illustration of the capacitor of FIG. 12 arrangement with a resistive layer and a heat sink to provide a snubber circuit.

The versatility of the geometry of the capacitor embodying the present invention is illustrated in FIGS. 14 and 15 wherein the capacitor arrangement of FIG. 12 is shown mounted on a heat sinking tab 140. As explained in connection with FIG. 13, the capacitor 98 is configured with buses contacts 130 and 132 which may require electrical isolation from the heat sink tab 140 in which case a dielectric layer 138 is provided between the surface of the bus 132 and the surface of the heat sink 140. A layer of resistive material 142 may be arranged or deposited in series with the capacitor element 98. If desired, an intermediate connection 144 may be inserted between the capacitor 98 and the layer of resistive material 142. The construction illustrated in FIGS. 14 and 15 permit the fabrication of a snubbing circuit or other resistor-capacitor type circuit combination. Normally, such circuits include lead lengths and terminations of one type or another and introduce series inductance which limits the high frequency operation of the resistor-capacitor combination. Accordingly, it is readily seen that the geometry of the capacitor of the present invention when use with a series resistor as described above is a significant improvement over the prior art.

Figure 16:
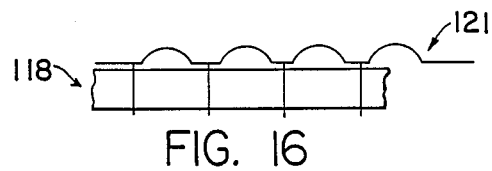
FIG. 16 illustrates a convoluted connector plate which may be utilized to relieve stress due to differences in the thermal expansion of the materials of the capacitor.

The capacitor of the present invention is capable of survivng in extreme temperature environments wherein the mismatch of the normal coefficient of expansion of the materials used in the capacitor can be a problem. This problem of temperature cycling in multi-layer ceramic capacitors is especially bothersome and is overcome in the present invention. Considering FIG. 16, the capacitor illustrated in FIG. 10 is shown connected to a bus using a convoluted shaped bus connection in the longitudinal direction to relieve any stress due to mismatches in the coefficient of thermal expansion of the component parts. Only those portions of the capacitor that are necessary to gain an understanding are shown in FIG. 16. It will be noted that any stresses in a transverse direction to the longitudinal direction of the bus 121 are relieved due to the interdigitation of the bus.

Figure 17:
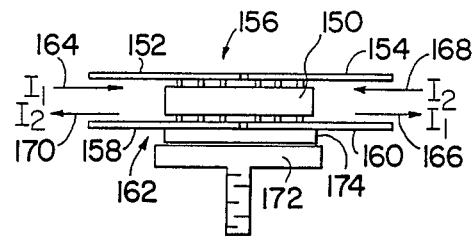
FIG. 17 illustrates diagrammatically a four terminal capacitor mounted on a heat sink.

Considering now FIG. 17, the capacitor of the present invention is shown diagrammatically within the block 150 and is configured as a four terminal capacitor. Buses 152 and 154 are interdigitated along one surface 156 of the capacitor and buses 158 and 160 are along the surface 162 opposite the surface 156 of the capacitor 150. Buses 152 and 160 are connected to the same plates of the capacitor 150. Likewise, buses 154 and 158 are connected to the other set of plates of the capacitor 150. To further illustrate the capacitor as a four terminal capacitor, current $I_1$ is conducted in the bus 152 in the direction of arrow 164 through the capacitor and in the bus 160 in the direction arrow 166. Current $I_2$ is conducted in the bus 154 in the direction of arrow 168 through the capacitor and in the bus 158 in the direction of arrow 170. The capacitor of FIG. 17 may also mounted to a heat sink terminal 172 as explained above. Likewise, a dielectric layer 174 may be used to provide electrical isolation between the capacitor and the heat sink 172.

Figure 18:
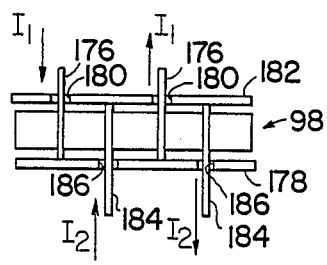
FIG. 18 illustrates another embodiment of the capacitor of the present invention.

FIG. 18 illustrates another embodiment of the capacitor similar to the capacitor illustrated in FIG. 12. In FIG. 18 pins 176, 176 are associated with one conductor plates 178 and pass through openings 180 in a second conductor plate 182 at the opposite side of the capacitor 98 and provide a pin grid termination arrangement. Likewise, pins 184, 184 pass through openings 186, 186 and extend beyond the conductor plate 178 to provide a pin grid termination arrangement. The openings 180, 180 and 186, 186 are in registration with the clearance openings and contact holes of the respective interleaved plates comprising the capacitor 98. Alternatively, pins 176, 176 and 184, 184 may extend on the same side of the capacitor 98 for mounting in a printed circuit board.

Figure 19:
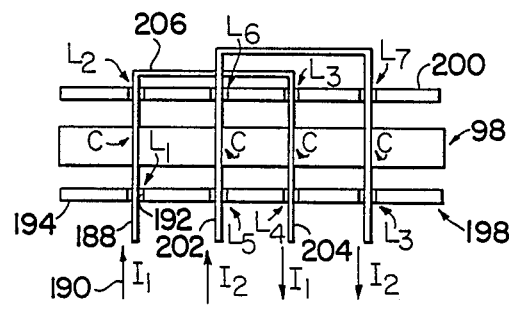
FIG. 19 illustrates diagrammatically the capacitive element of the present invention wherein the pins connecting the alternate plates are "U" shaped to handle larger DC currents and wherein a ferrite layer surrounds the "U" shaped wire to provide a series inductance to the DC current.
Figure 19A:
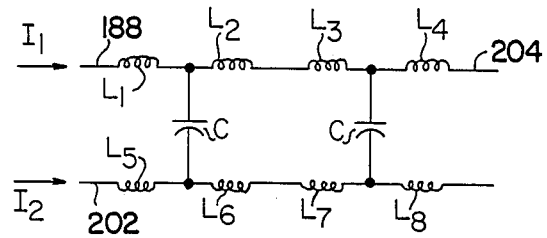
FIG. 19a is a electrical equivalent circuit for the capacitor arrangement of FIG. 19.

Another embodiment of the capacitor of the present invention is illustrated in FIG. 19 wherein the capacitor element is the same as the capacitor element 98 of FIG. 12 and is illustrated diagrammatically in FIG. 19. In FIG. 19, "U" shaped wires pass through the capacitor element 98 and is arranged so that each leg contacts the same set of electrodes as is discussed above and replace the pins or stakes. Current $I_1$ entering leg 188 in the direction arrow 190 is conducted by leg 188 which passes through an opening 192 in a layer of ferrite material 194 located along one side of the capacitor element 198. The leg 188 further passes through a layer of ferrite material 200 located at the opposite side of the capacitor element 98. Care must be taken to prevent shorting to the ferrite when the ferrite is conductive. The passage of the leg through the ferrite material forms an inductor which provides a series impedance for improved filtering of high frequency noise when the capacitor is used in a filtering application. Larger value DC currents are shunted along the bridge wire path 206 and thus not forced through the plates forming the capacitor. Additional layers of ferrite material could be added to introduce additional series impedance for filtering higher frequencies. The application of the ferrite material is also applicable to the capacitor configurations discussed above. An equivalent electrical circuit of the capacitor arrangement of FIG. 19 is illustrated in FIG. 19a.

Turning now to FIG. 20, another embodiment of the capacitor of the present invention is illustrated in plan view and is generally designated 210. It will be noted that the capacitor 210 of FIG. 20 is similar to the capacitor described above in connection with FIG. 11 and is constructed similarly. The capacitor 210 includes a plurality of foil sheets or plates 212, 212 forming a first electrode and stacked in an interleaved fashion with a plurality of foil sheets or plates 214, 214 with a dielectric sheet 216 between adjacent plates 212 and 214. Pins or stakes connect alternating plates and form a grid pin arrangement. The capacitor 210 includes a split section generally designated 218 which is formed by pin 220 connecting a plurlaity of sections 212a cut from the plates 212, 212 and which form a third electrode. FIG. 21 illustrates schematically the capacitor 210 of FIG. 20 with the first electrode generally designated 222, the second electrode being generally designated 224 and the third electrode being generally designated 226.

The utility of the split capacitor illustrated in FIGS. 20 and 21 is readily seen by referring to FIGS. 22 and 23. FIG. 22 is a schematic diagram of a symmetrical push-pull circuit using two split capacitors as illustrated in FIG. 21. The circuit of FIG. 22 is recognized as a symmetrical push-pull type circuit generally designated 228 and includes field-effect-transistors (FET) 230 and 232 each having source, gate and drain terminals. In the schematic diagram of FIG. 22 a floating capacitor generally designated 234 has one electrode 236 connected to the drain terminal 238 of the FET 230. A second electrode 240 is connected to the source terminal 242 of the FET 232. Reference may be made to patent application Ser. No. 220,532, filed Jul. 18, 1988 intitled "Transformer having Symmetrical Push Pull Windings" and assigned to the same assignee as the present invention.

A snubber circuit comprising the resistor 244 and snubber capacitor 246 is connected conventionally between the drain and source terminals of the FET 232. The snubber capacitor 246 comprises an electrode 248 connected to one end of the resistor 244 and a second electrode to the source terminal 242 of the FET 232. It is seen that the second electrode of the snubber capacitor is the same electrode 240 used for the floating capacitor 234. It is further recognized that the floating capacitor 234 and snubber capacitor 246 can be made from the split capacitor of FIGS. 20 and 21.

A similar floating capacitor and snubber circuit are associated with the FET 230. A floating capacitor generally designated 250 includes a first electrode 252 connected to the drain terminal 254 of the FET 232. The second electrode 256 of the floating capacitor 250 is connected to the source terminal 258 of the FET 230. A snubber circuit comprising resistor 260 and the snubber capacitor generally designated 262 are connected across the drain and source terminals of the FET 230. The snubber capacitor 262 includes an electrode 264 connected to the snubber resistor 260. The second electrode of the snubber capacitor 262 is the second electrode 256 of the floating capacitor 250 and as stated above it is seen that the split capacitor for FIGS. 20 and 21 may be used to provide the floating capacitor 250 and the snubber capacitor 262.

FIG. 23 illustrates an exemplary component layout for the circuit of FIG. 22 and includes a hydbrid circuit substrate 266 upon which FETs 230 and 232 are fabricated using hybrid circuit technology. The snubber resistors 244 and 260 are also made using the hybrid circuit technology. The floating capacitor 234 and snubber capacitor 246 are shown in plan view and are constructed in accordance with the present invention. Likewise, the floating capacitor 250 and snubber capacitor 262 are shown in plan view and constructed in accordance with the present invention. The interconnection of the circuit components are made using well known techniques.

Figure 24:
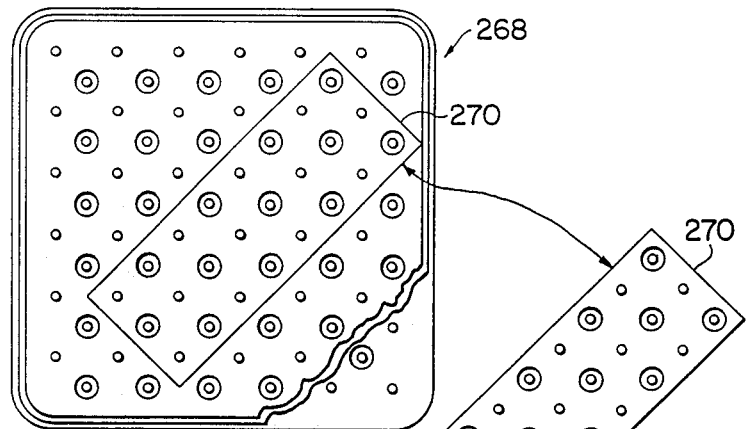
FIG. 24 is a plan view of the multipin capacitor of the present invention showing a section removed to form a basic capacitive structure to accommodate various packaging configurations.
Figure 25:
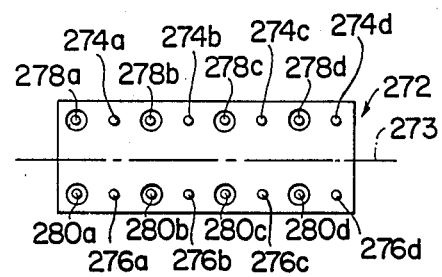
FIG. 25 is a plan view of a pin grid inline package configuration of a multipin capacitor of the present invention.
Figure 29:
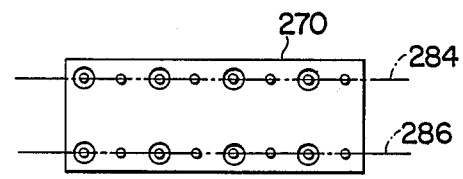
FIG. 29 is a plan view of the capacitor section of FIG. 24 showing the location of a vertical in-line cut to form a capacitive element that may be used in alternate package arrangements.
Figure 26:
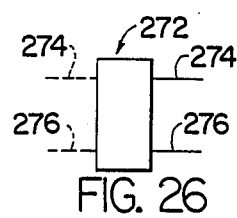
FIG. 26 is an end view of the capacitor of the FIG. 25.
Figure 30:
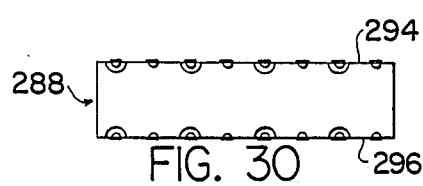
FIG. 30 shows the resultant cut section of FIG. 29.

The versatility of the present invention due to its geometry and structure and its adaptability as a multipin capacitor element is further illustrated by referring to FIGS. 24-31. FIG. 24 illustrates a multipin matrix capacitor in plan view and which is similar in appearance to the to the multipin matrix capacitor embodying the present invention as illustrated in FIG. 11. The capacitor of FIG. 22 is generally designated 268. A rectangular section 270 of the capacitor 268 may be envisioned as a basic structural capacitor element which may be packaged in a number of different configurations as further explained below. The section 270 may be configured as illustrated in FIGS. 25 and 26 to provide a dual-in-line package (DIP) arrangement which is suitable for pin grid arrangements. The capacitor element is generally designated 272 and includes pins located along the periphery in the longitudinal direction and in an in-line fashion. As explained and described above, the pins extend through the interleaved plates making contact with the appropriate alternating plates to form the capacitor. As illustrated in FIG. 25, pins 274a, b, c, and d are located longitudinally in-line connected to one set of plates forming a first electrode of the capacitor and pins 276a, b, c, and d are located longitudinally in-line transversely opposite the pins 274a, b, c, and d and connect to the same plates forming the first electrode. Similarly, ends 278a, b, c, and d are located longitudinally in-line with the pins 274 and connect to the appropriate plates of the capacitor forming a second electrode. Pins 280a, b, c. and d are located longitudinally in-line with pins 276 and are connected to the same plates of the capacitor forming the second electrode. The capacitor of FIG. 25 can further be envisioned as a single-in-line (SIP) capacitor by cutting the capacitor in half along the longitudinal line 273.

The pins 274, 276, 278 and 280 may extend through the package forming the capacitor 272 in a desired orientation as explained above and further illustrated by the end view of the capacitor 272 as illustrated in FIG. 26. In FIG. 26, pins 274, 276 are shown extending from the capacitor body in one direction as illustrated by the solid lines. Likewise, the pins 274, 276, 278, and 280 may extend from the capacitor body in a direction opposite to that shown and which is illustrated by the dashed line representation of the pins 274 and 276. In some instances, it may be desirable to extend the pins of the capacitor in both directions and such a packaging configuration is illustrated in FIGS. 27 and 28.

Figure 28:
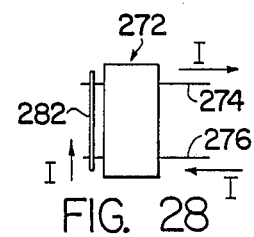
FIG. 28 is an end view of the capacitors of FIG. 27.
Figure 27:
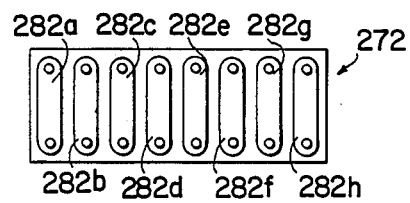
FIG. 27 is a plan view of a pin grid in-line capacitor wherein additional component elements are attached to the connecting pins.

Recalling from above that it is possible with the present invention to add ferrite material to increase the impedance of the capacitor at higher frequencies, such additional components may be added using the embodiments shown in FIGS. 27 and 28. In FIG. 27 a plan view of the in-line pin grid capacitor arrangement of FIG. 25 is illustrated wherein additional components designated 282b, c, d, e, f, g, h, are illustrated connecting transversely opposite pins which are connected to the same plates respectively as explained in conjunction with FIG. 25. FIG. 28 illustrates and end view of the packaging arrangement FIG. 27 and it will be recognized that FIG. 28 is functionally equivalent to FIG. 12b.

Figure 31:
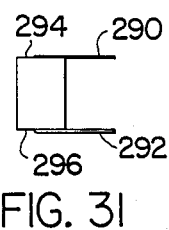
FIG. 31 is an end view of the capacitor section of FIG. 30 with leads attached to the capacitive element.

An additional packaging arrangement using a conventional dual in-line package may be formed from the capacitor section 270 of FIG. 24 by cutting the section in a longitudinal direction as indicated by the dashed lines 284 and 286 and substantially along the center points of the clearance and the contact openings of the plates forming the capacitor. The resultant cut package is illustrated in plan view in FIG. 30 and is generally designated 288. Pins or conventional integrated circuit leads may now be connected or bonded to the proper plates forming the first and second electrodes to form a multipin dual in-line capacitor. Obviously, the connection or bonding of the leads must be done to ensure that no shorting occurs between adjacent plates forming the two electrodes of the capacitor. FIG. 31 is an end view of such a dual in-line package capacitor wherein leads 290 and 292 are located along the longitudinal peripheral edges 294, 296 respectively of the package 288 illustrated in FIG. 30. The capacitor of FIG. 31 is functionally equivalent to the capacitor of FIG. 8.

Figure 32:
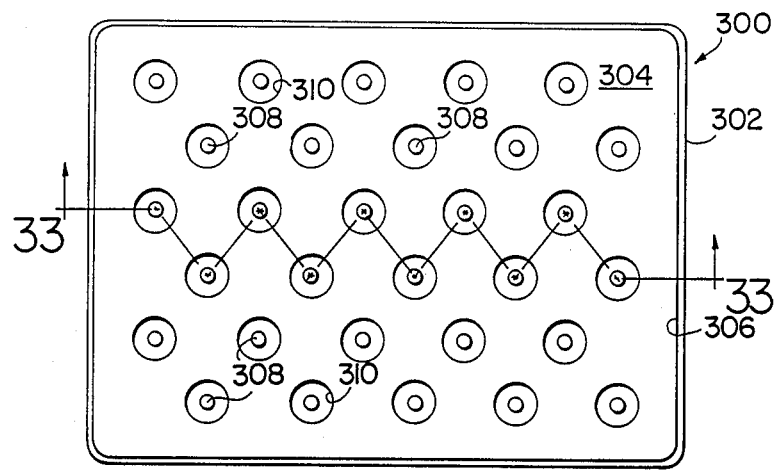
FIG. 32 is a plan view of another embodiment of the multipin capacitor of the present invention wherein the capacitor is an electrolytic capacitor.
Figure 33:
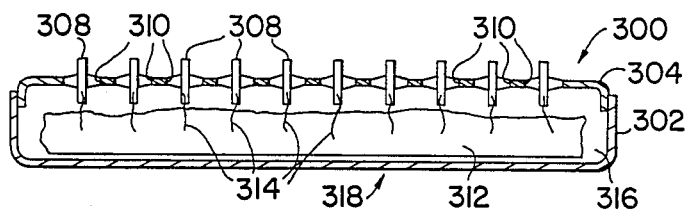
FIG. 33 is a sectional view taken along the line 33—33 of FIG. 32.

Turning now to FIGS. 32 and 33, another aspect of the multipin capacitor of the present invention is presented as embodied in an electrolytic capacitor. The multipin capacitor is generally designated 300 and shown in plan view in FIG. 32. The capacitor 300 includes an outer case 302 which functions as the cathode terminal and a top cover 304 which is sealed along its periphery 306 to the inner side of the case 302. The anode terminals or pins 308, 308 are arranged in a grid like manner and project from the surface of the top cover 304 and which form the anode terminals of the capacitor 300. A seal 310 surrounds the anode terminals 308 to form a seal between the terminal and the top cover 304, thereby hermetically sealing the capacitor.

Turning to FIG. 33, a cross sectional area of the capacitor 300 illustrated in FIG. 32 is shown therein wherein like reference numerals refer to like parts. Unlike conventional electrolytic capacitors that usually have a sintered pellet upon which a thin film such as tantalum oxide is deposited to form the anode and to which a wire is attached to form one electrode of the capacitor and which is enclosed in a case which is filled with an electrolyte to form the second electrode of the capacitor, the anode is distributed over a larger area to provide contact along a greater portion of the anode. Conventional electrolytic capacitors also do not generally function well as a capacitor at higher frequencies due to the effect of lead inductance. As in the case of the multiple pin capacitor embodying the present invention and as described above, the capacitor 300 minimizes the inductive effects due to lead lengths by providing a number of anode terminals across the surface of the capacitor. As illustrated in FIG. 33, the anode 312 is a large substantially flat sintered anode which preferably is a sintered tantalum. Each of the anode terminals 308, 308 are connected to the anode 312 via short leads 314, 314 to provide a multi-pin electrolytic capacitor which overcomes the problem of lead inductance since the conduction paths between the anode and the terminals 308, 308 are very short and distributed across the surface of the anode 312.

The second electrode of the capacitor 300 is formed by the case 202 and the electrolyte 316 which is within the cavity formed by the case 202 and cover 304 provides conduction. As in the case of conventional electrolytic capacitors, the electrolyte may be of a solid, "wet slug" or "gel" substance. Furthermore, the construction of the capacitor 300 is such that the case 302 provides a large surface area gnerally designated 318 to function as a heat sink.

Figure 34:
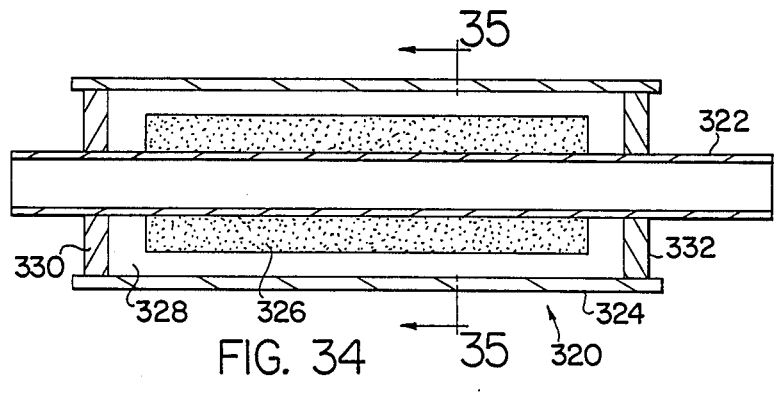
FIG. 34 is another embodiment of the present invention and illustrates a sectional view of an electrolytic tubular capacitor.
Figure 35:
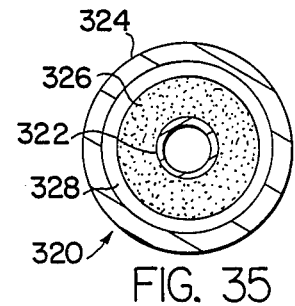
FIG. 35 is a cross sectional view taken along the line of 35—35 of FIG. 34.

Turning now to FIGS. 34 and 35, the concept of the present invention is extended to a tubular capacitor generally designated 320 wherein a tubular anode terminal 322 is located coaxially within a case 324 which functions as the cathode electrode. The tubular anode terminal 322 is surrounded by a sintered anode 326 and contacts the surface of the tubular anode terminal 322. In comparison to the finite number of wires 314, 314 that contact the anode 312 of the capacitor 300 of FIGS. 32 and 33, the contact between the sintered anode 326 and the surface of the tubular anode. of 322 may be considered to be an infinite number of wire connections. As with the conventional electrolytic capacitor, the area 328 within the case 324 is filled with an electrolyte to provide a conduction path to the case. The capacitor is hermetically sealed by use of seals 330, 332 which provide a seal between the circumferential surface of the tubular anode terminal 322 and the inner circumferential surface of the case 324. The construction and the geometry of the capacitor 320 contribute to a capacitor having good heat sinking qualities and low lead inductance. FIG. 35 is a sectional view taken along the line 35—35 of FIG. 34.

Turning to FIGS. 36-40, the electrolytic equivalents to the capacitor structure and geometry of the capacitors illustrated in FIGS. 1 and 9, respectively are shown. FIGS. 36 includes a "first plate" 340 which is a sintered anode and a "second plate" 342 which is the case. FIG. 37 is a view looking at the capacitor of FIG. 36 along the direction 37—37 and FIG. 38 is a view looking at the capacitor of FIG. 36 along the direction 38—38. FIG. 39 is a fragmentary view of a section of FIG. 38. FIG. 40 illustrates a capacitor made by stacking the structural elements of FIG. 36 and connecting the anodes of each element with pins or stakes 344, 344. A second connection is made to the case via termianls 346, 346. Construction restrictions and precautions associated with the multi-pin capacitor disclosed above are also applicable for the electrolytic equivalent.

A multipin matrix capacitor has been described above in several preferred embodiments which substantially minimize or eliminate the effects of lead inductance on capacitor performance at high frequencies. Numerous modifications and substitutions may be made to the embodiments described and therefore, the invention has been presented by way of illustration rather than limitation.

We claim:

1. A matrix capacitor for use at high frequencies, said capacitor comprising:
    a first electrode defining an anode;
    a second electrode defining a cathode;
    a dielectric material;
    said first and second electrodes being located adjavent to and in close proximity to one another and separated by said dielectric material thereby forming a capacitive element;
    first means for connecting to said first electrode, said first connecting means being distributed along said first electrode and defining a multiple number of individual connection points with said first electrode, and
    second means for connecting to said second electrode, said second connecting means being distributed along said second electrode and defining a multiple number of individual connection points with said second electrode.

2. A matrix capacitor as defined in claim 1 further comprising:
    said first electrode comprising a first plurality of sheets of conductive material;
    said second electrode comprising a second plurality of sheets of conductive material;
    each of said sheets in said first and second plurality of sheets having first and second major surface faces disposed opposite one another and each of said sheets having an array of first and second opening extending through the sheet between said first and second faces, said array being characterized by the laternate arrangement of said first and second openings such that a first opening is spaced equidistant from an adjacent second opening and second opening is spaced equidistant from an adjacent first opening, and said sheets in said first and second plurality of sheets being stacked in an interleaved arrangement and separated by said dielectric material, said first and second sheets further being oriented so that a first opening of one sheet in the stack is in registration with a second opening in an immediately adjacent sheet and a second opening in said one sheet is in registration with a first opening in said immediately adjacent sheet.

3. A matrix capacitor as defined in claim 2 further comprising said first openings being larger than said second openings to provide clearance for said first connecting means connecting said conductive sheets comprising said first electrode thereby preventing said first connecting means from contacting said conductive sheets comprising said second electrode and to provide clearance for said second connecting means connecting said conductive sheets comprising said second electrode thereby preventing said second connecting means from contacting said conductive sheets comprising said first electrode.

4. A matrix capacitor as defined in claim 3 further comprised by said first and second connecting means being a plurality of elongated pins having a cross sectional area larger than said second opening and smaller than said first opening whereby an interference fit is created between one of said pins and said first openings in registration in said conductive sheets comprising said first electrode, and between another of said pins and said first openings in registration in said conductive sheets comprising said second electrode, said plurality of pins forming a grid array pattern.

5. A matrix capacitor as defined in claim 4 wherein said pins protrude outwardly beyond the face surface of an outermost conductive sheet associated with one of said first and second electrodes.

6. A matrix capacitor as defined in claim 4 wherein said pins connected to said conductive sheets comprising said first electrode protrude outwardly beyond the face surface of one of an outermost conductive sheet associated with one of said first and second electrodes, and wherein said pins that are connected to said conductive sheets comprising said second electrode protrude outwardly beyond the face surface of an outermost conductive sheet associated with the other of said first and second electrodes.

7. A matrix capacitor as defined in claim 2 wherein one of said first and second plurality of sheets of conductive material is sectioned so that a third electrode is defined whereby said matrix capacitor is split to form two capacitors.

8. A matrix capacitor as defined in claim 1 wherein said first electrode is made of sintered tantalum and said second electrode is a container means, said container means including an electrolyte surrounding said tantalum, said tantalum being spread in approximate conformity with the inner surface area of said container means, a plurality of terminals arranged in a grid array and connected to said tantalum for providing connection to external circuit elements and along th the surface of said tantalum to minimize the conduction path to the capacitive element, said first and second electrodes being enclosed in an hermetically sealed case.

9. A multipin matrix capacitor for use at high frequencies, said capacitor comprising:
a plurality of first sheets of conductive material defining a fist electrode;
a plurality of second sheets of conductive material defining a second electrode;
a plurality of sheets of dielectric material;
said first and second sheets of conductive material being stacked in an interleaved arrangement with one of said sheets of dielectric material separating said first and second sheets of conductive material;
a plurality of first means contacting said first sheet of conductive material to provide means for connecting to said first electrode;
a plurality of second means contacting said second sheet of conductive material to provide means for connecting to said second electrode, and
said first and second contacting means being disposed adjacent one another in a grid arrangement so that contact with said first and second electrodes is distributed along the surface of said first and second sheets of conductive material to minimize a conduction path between said first and second contacting means and said first and second electrodes respectively whereby inductance due to the conduction path is substantially eliminated.

10. A multipin matrix capacitor as deifned in claim 9 wherein said first electrode is located transversely to said second electrode.

11. A matrix capacitor for use at high frequencies, said capacitor comprising:
a plurality of first sheets of conductive material defining a first electrode;
a plurality of second sheets of conductive material defining a second electrode;
a plurality of sheets of dielectric material;
said first and second sheets of conductive material being stacked in an interleaved arrangement with one of said sheets of dielectric material separating said first and second sheets of conductive material;
first means contacting said first sheet of conductive material to provide means for connecting to said first electrode, and
second means contacting said second sheet of conductive material to provide means for connecting to said second electrode;
said first sheets of conductive material being disposed in a transverse relationship with said second sheets of conductive material,
said first and second sheets having oppositely disposed peripheral edges;
said first contacting means further comprising each of said first sheets being connected to one another along respective like peripheral edges to define a first terminal at one set of connected edges and a second terminal at the oppositely disposed set of connected edges;
said second contacting means further comprising each of said second sheets being connected to one another along respective like peripheral edges to define a third terminal at one set of connected edges and a fourth terminal at the oppositely disposed set of connected edges, whereby a DC electrical current conduction path is created across said first sheets and between said first and second terminals and a second DC electrical current conduction path is created across said second sheets and between said third and fourth terminals.

12. A matrix capacitor as defined in claim 11 wherein said first electrode is located transversely to said second electrode.

13. A matrix capacitor as defined in claim 12 wherein said first and second plurality of conductive sheets are metalized foil.

14. A matrix capacitor as defined in claim 12 wherein said first and second plurality of conductive sheets are extended foil.

15. A matrix capacitor as defined in claim 11 wherein said first and second conductive sheets are metalized foil.

16. A matrix capacitor as defined in claim 11 wherein said first and second conductive sheets are extended foil.

17. A matrix capacitor as defined in claim 11 further comprising a first DC electrical current conduction path between said connection points with said first electrode and a second DC electrical current conduction path between said connection points with said second electrode.

18. A matrix capacitor for use at high frequencies, said capacitor comprising:
   a first electrode defining an anode;
   a second electrode defining a cathode;
   a dielectric material;
   said first and second electrodes being located adjavent to and in close proximity to one another and separated by said dielectric material thereby forming a capacitive element;
   first means for connecting to said first electrode, said first connecting means being distributed along said first electrode and defining a multiple number of individual connection points with said first electrode;
   second means for focnnecting to said second electrode, said second connecting means being distributed along said second electrode and defining a multiple number of individual connection points with said second electrode, and
   wherein said first electrode is made of sintered tantalum and said second electrode is a container means, said container means including an electrolyte surrounding said tantalum, said tantalum being spread in approximate conformity with the inner surface area of said container means, a plurality of terminals arranged in a grid array and connected to said tantalum for providing connection to external circuit elements and along the surface of said tantalum to minimize the conduction path to the capacitive element, said first and second electrodes being enclosed in an hermetically sealed case.

19. A matrix capacitor for use at high frequencies, said capacitor comprising:
   a first electrode defining an anode;
   a second electrode defining a cathode;
   a dielectric material;
   said first and second electrodes being located adjacent to and in close proximity to one another and separated by said dielectric material thereby forming a capacitive element;
   first means for connecting to said first electrode, said first connecting means being distributed along said first electrode and defining a multiple number of individual connection points with said first electrode;
   second means fro connecting to said second electrode, said second connecting means being distributed along said second electrode and defining a multiple number of individual connection points with said second electrode;
   said first electrode comprising a first plurality of sheets of conductive material;
   said second electrode comprising a second plurality of sheets conductive material;
   each of said sheets in said first and second plurality of sheets having first and second major surface faces disposed opposite one another and each of said sheets having an array of first and second openings extending through the sheet between said first and second faces, said array being characterized by the alternate arrangement of said first and second openings such that a first opening is spaced equidistant from an adjacent second opening and a second opening is apaced equidistant from an adjacent first opening;
   said sheets in said first and second plurality of sheets being stacked in an interleaved arrangement and separated by said dielectric material, said first and second sheets further being oriented so that a first opening of one sheet in the stack is in registration with a second opening in an immediately adjacent sheet and a second opening in said one sheet is in registration with a first opening in said immediately adjacent sheets, and
   one of said first and second plurality of sheets of conductive material being sectioned so that a third electrode is defined whereby said matrix capacitor is split to form two capacitors.

* * * * *